A. FRETZ.
SPEED CHANGING DEVICE.
APPLICATION FILED APR. 18, 1913.
1,112,205.
Patented Sept. 29, 1914.
2 SHEETS—SHEET 1.
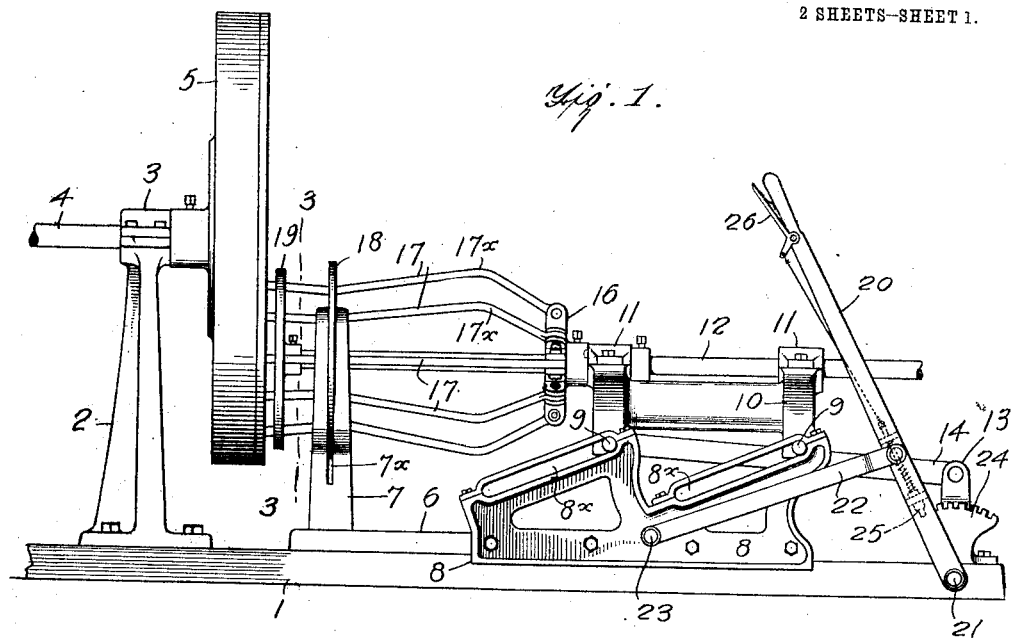
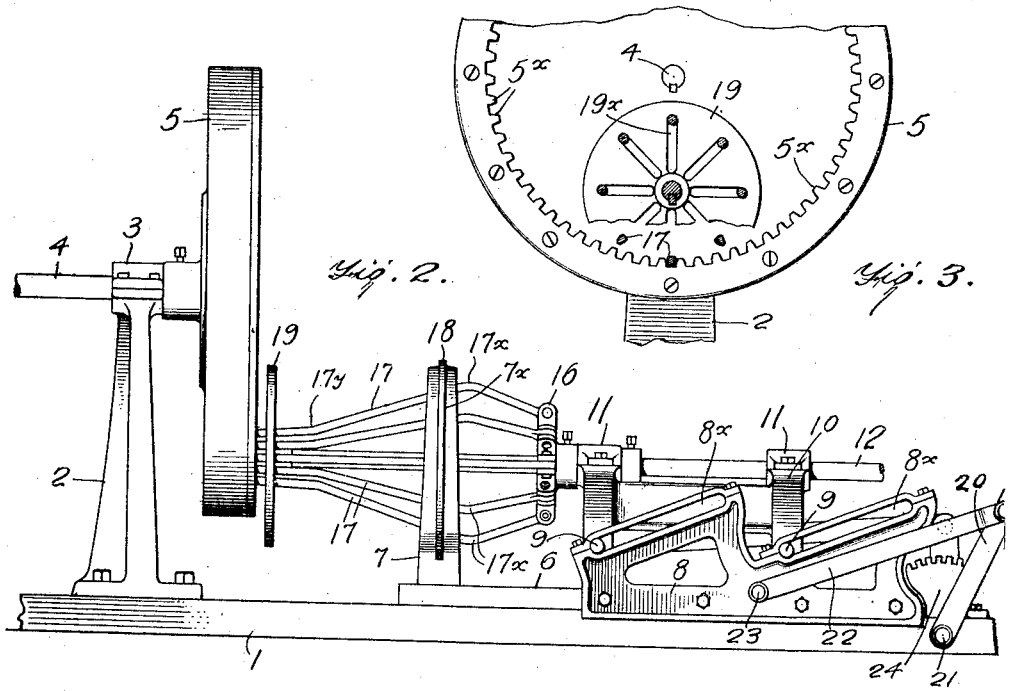
WITNESSES
L. H. Schmidt.
R. A. Stanley
INVENTOR
AARON FRETZ,
BY Munn & Co.
ATTORNEYS

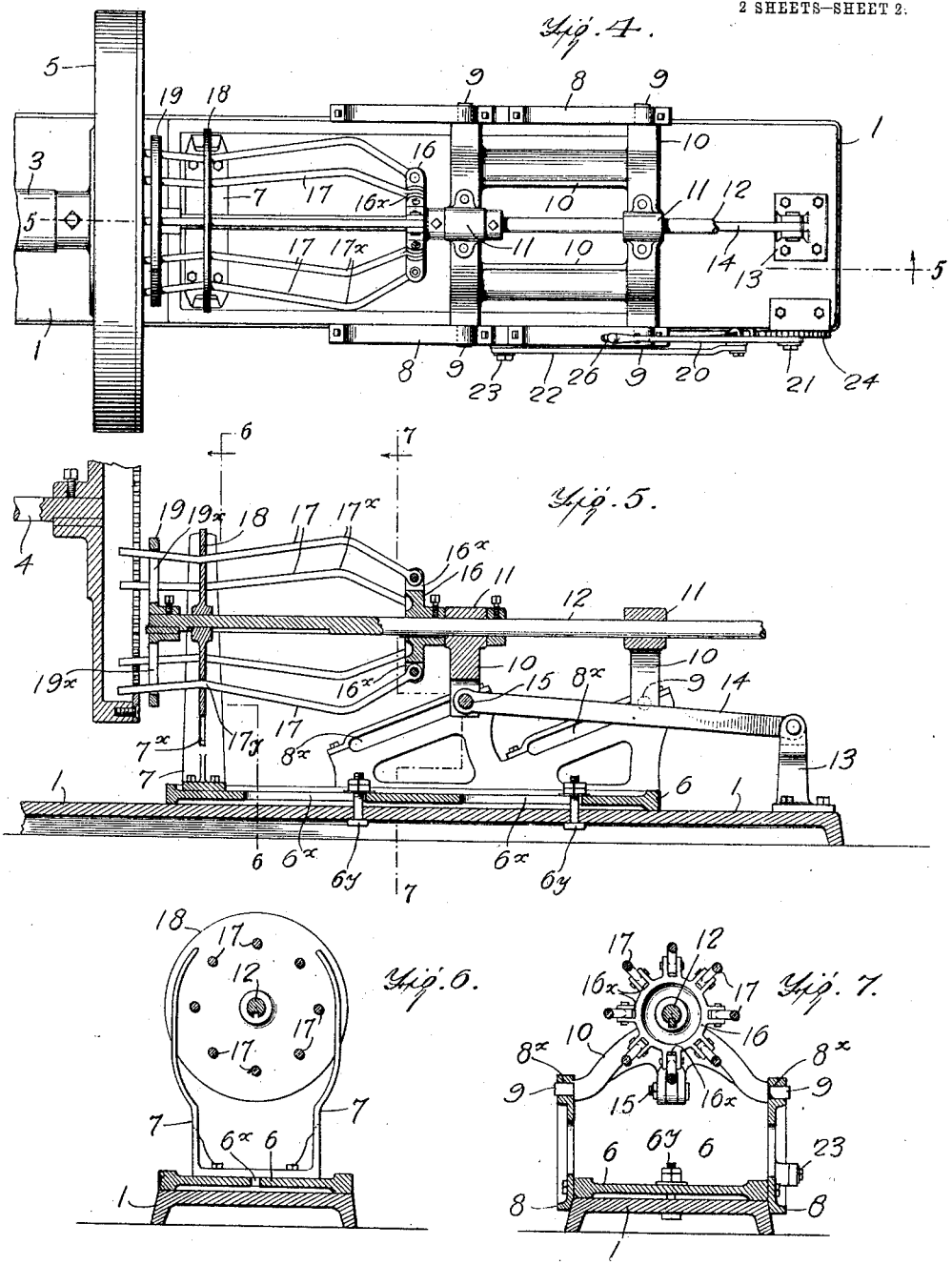

000
UNITED STATES PATENT OFFICE.

AARON FRETZ, OF EDMOND, OKLAHOMA.

SPEED-CHANGING DEVICE.

1,112,205.  Specification of Letters Patent.  Patented Sept. 29, 1914.

Application filed April 18, 1913. Serial No. 761,975.

*To all whom it may concern:*

Be it known that I, AARON FRETZ, a citizen of the United States, and a resident of Edmond, in the county of Oklahoma and State of Oklahoma, have made certain new and useful Improvements in Speed-Changing Devices, of which the following is a specification.

My invention relates to improvements in speed governing devices, and it consists in the combinations, constructions and arrangements herein described and claimed.

An object of my invention is to provide a speed governing device in which the speed may be controlled by the movement of a single lever.

A further object of my invention is to provide a device in which any speed from a minimum speed to the maximum speed may be secured by the movement of the same lever.

A further object of my invention is to provide a novel form of apparatus for accomplishing the above named objects.

A further object of my invention is to provide a device which has few moving parts, and which being simple in its nature is not liable to get out of order.

Other objects and advantages will appear in the following specification and the novel features of the device will be particularly pointed out in the appended claims.

My invention is illustrated in the accompanying drawings forming part of this application in which—

Figure 1 is a side view of the device showing the parts in one position, Fig. 2 is a similar view showing the parts in another position, Fig. 3 is a section along the line 3—3 of Fig. 1, a portion of the slotted plate being broken away, Fig. 4 is a plan view of the device, Fig. 5 is a section along the line 5—5 of Fig. 4, Fig. 6 is a section along the line 6—6 of Fig. 5, and Fig. 7 is a section along the line 7—7 of Fig. 5.

In carrying out my invention I provide a base 1 having an upright 2 provided with a bearing 3 arranged to receive a shaft 4 at whose end is secured an internal gear 5. Slidably secured upon the base 1 is a plate 6, which is provided with slots $6^x$ (see Fig. 5) arranged to receive guide bolts $6^y$. The plate 6 is provided with a U-shaped guide member 7, which is provided with a slot $7^x$. Secured on the opposite side of the plate 6 are the side members 8. These frames project downwardly below the upper part of the base member 1 and form guide members, as shown in Fig. 7. The side members 8 are provided with inclined slots $8^x$ arranged to receive cylindrical arms or lugs 9 of a frame 10. This frame is provided with bearings 11 for a drive shaft 12. The base 1 is provided with an upright 13 to which is pivoted an arm or link 14, the end of this arm having a pivotal connection at 15 with the frame 10 (see Fig. 4).

Secured upon the shaft 12 is a collar 16 which is slotted at $16^x$ to receive the ends of a series of movable arms 17, these arms being pivoted within the slots $16^x$. The arms 17, as shown in the drawings, extend outwardly from the collar 16, and then each of the arms is bent inwardly at $17^x$ toward the shaft 12. At $17^y$ they are again bent outwardly.

Slidably disposed on the shaft 12 is a spreader plate 18 through which the arms 17 extend. This spreader plate 18 is disposed in the slot $7^x$ of the guide member 7. Secured at one end of the shaft 12 is a disk 19 provided with radially extending slots $19^x$ through which the ends of the arms 17 are designed to extend, as shown in Fig. 5. The ends of the arms 17 are shaped so as to engage the teeth $5^x$ on the internal gear 5 as shown in Fig. 3. A hand lever 20 is pivoted at 21 to any convenient portion of the frame and is provided with a link 22 which is pivotally connected at 23 with one of the side members 8.

From the foregoing description of the various parts of the device the operation thereof may be readily understood.

Power is designed to be applied to the power shaft 12 in any suitable manner. This will rotate the disk 19 and will cause the ends of the arms 17 to rotate the gear 5 as the arms successively come into registration with the teeth $5^x$ of the gear. In Figs. 1 and 3, I have shown the arms as being forced apart so as to give the maximum speed. Now if it is desired to decrease the speed the lever is shifted in the direction shown by the arrow in Fig. 1. This will cause a slidable movement of the side members 8 and the frame 10 to be lowered, the lugs 9 sliding down the inclined slots $8^x$. It will thus be seen that the members 8 act as cams for raising and lowering the frame 10. It will be observed that the link 14 will prevent a bodily movement of the frame 10 longitudinally of the shaft. The shaft 12 is lowered as is also the disk 18. The latter, however, is forced toward the bent portions 17ˣ of the arms 17, since these arms are inclined between the points 17ˣ and 17ʸ it will force the arms together, thereby bringing their ends closer together and forming in reality a gear having a smaller diameter than when the arms are spread apart. The result is a slower speed imparted to the large gear 5. The slots 8ˣ are so designed that the lowermost arm is always in mesh with the teeth of the internal gear. This is accomplished by lowering and raising the drive shaft as the arms are drawn toward or forced away from the shaft. It will be observed that as the plate 6 is moved along it carries with it the guide member 7 thus moving the spreader plate 18 and thus causing the spreading of the arms in a radial direction toward and away from the shaft. Any suitable device such as a locking segment may be provided for locking the device in its shifted position and for insuring the meshing of the ends of the arms 17 with the teeth on the gear 5. Such a device is shown at 24.

The spring-actuated locking tooth 25 is designed to enter the notches of the locking segment corresponding to the position of the teeth on the gear 5 so that when the locking lever 26 is pressed the locking member 25 may be drawn out of engagement with the locking member 24 and the hand lever 20 may be shifted to any position. The release of the locking lever 26 will cause the tooth 25 to enter one of the recesses in the locking segment 24, thereby locking the device securely in position and also insuring the proper registration of the ends of the arms 17 with the teeth of the gear 5. It is obvious that as the arms 17 are brought nearer together they will engage the teeth of the gear 5 which are nearer together. For instance the arms may be close enough to engage every tooth, or they may be far enough away to engage every second tooth, or when still farther away every third tooth, etc., but since the shaft which carries the arms rotates at a definite speed the gear 5 will be driven at a greater speed when the arms are far apart than it will when they are close together.

A device constructed according to the above invention is comparatively simple when one takes into consideration the fact that a number of different speeds may be secured by its use. The device may be applied to any machine in which different speeds are required, and is particularly applicable to automobiles.

I claim:

1. A speed changing device comprising a driving shaft, a driven shaft, a gear on said driven shaft, a series of pivoted arms, the ends of the pivoted arms being movable toward and away from a common center, and being arranged to continuously engage the teeth of the gear for driving the latter, means for simultaneously moving the ends of the arms toward and away from the common center, and means for moving said driving shaft to maintain the ends of the pivoted arms in operative relation with the teeth of the gear.

2. A speed changing device comprising a driving shaft, a driven shaft, a gear on said driven shaft, a series of pivoted arms, the ends of the pivoted arms being movable toward and away from a common center, and being arranged to engage the teeth of the gear for driving the latter, and means for simultaneously moving the ends of the arms toward and away from the common center, the teeth of said driven gear being at all times in engagement with one of the arms.

3. A speed changing device comprising a base, slidable cam members carried by said base, a frame carried by said slidable cam, a driving shaft rotatably carried by the frame, means for moving the cam longitudinally of the shaft, means for preventing the movement of the frame, a series of spring arms pivotally carried by said shaft and rotatable therewith, a driven gear arranged to be engaged by the ends of said arms, and a spreading device movable with said cam for causing a simultaneous spreading of said arms toward or away from said driving shaft.

4. In a speed changing device, a driven gear, a driving shaft, a series of arms pivotally connected to said driving shaft, the ends of said arms being arranged to extend into engagement with the teeth of the gear, a guide plate having radially extending slots arranged to receive the end of the arms, means for simultaneously moving the arms away from or toward said driving shaft, and means for moving said driving shaft to maintain the ends of the pivoted arms in operative relation with the teeth of the gear.

5. In a speed changing device, a driven internal gear, a driving shaft, a series of arms pivotally connected with said driving shaft and disposed at equal intervals around said shaft, said arms having portions inclining at an angle to the central longitudinal axis of said shaft, the ends of the arms being arranged to engage the teeth of the internal gear, a slotted guide plate carried by said shaft, the slots in said guide plate being arranged to receive the ends of said arms, and a spreader plate arranged to engage the inclined portion of the arms for simultaneously moving the ends of the arms toward or away from said shaft.

6. In a speed changing device, a driven internal gear, a driving shaft, a series of arms pivotally connected with said driving shaft and disposed at equal intervals around said shaft, said arms having portions inclining at an angle to the central longitudinal axis of said shaft, the ends of the arms being arranged to engage the teeth of the internal gear, a slotted guide plate carried by said shaft, the slots in said guide plate being arranged to receive the ends of said arms, a perforated spreader plate slidably disposed on said driving shaft, said arms extending through the perforations in said spreader plate, and means for moving the spreader plate longitudinally of the inclined portion of the arms, thereby spreading the ends of the arms toward or away from the driving shaft.

7. In a speed changing device, a driven internal gear, a driving shaft, a series of arms pivotally connected with said driving shaft and disposed at equal intervals around said shaft, said arms having portions inclining at an angle to the central longitudinal axis of said shaft, the ends of the arms being arranged to engage the teeth of the internal gear, a slotted guide plate carried by said shaft, the slots in said guide plate being arranged to receive the ends of said arms, a perforated spreader plate slidably disposed on said driving shaft, said arms extending through the perforations in said spreader plate, means for moving the spreader plate longitudinally of the inclined portion of the arms, thereby spreading the ends of the arms toward or away from the driving shaft, and means for simultaneously raising or lowering the driving shaft.

8. In a speed changing device, a driven internal gear, a driving shaft, a series of arms pivotally connected with said driving shaft and disposed at equal intervals around said shaft, said arms having portions inclining at an angle to the central longitudinal axis of said shaft, the ends of the arms being arranged to engage the teeth of the internal gear, a slotted guide plate carried by said shaft, the slots in said guide plate being arranged to receive the ends of said arms, a perforated spreader plate slidably disposed on said driving shaft, said arms extending through the perforations in said spreader plate, means for moving the spreader plate longitudinally of the inclined portion of the arms, thereby spreading the ends of the arms toward or away from the driving shaft, means for simultaneously raising or lowering the driving shaft, and means for preventing the longitudinal movement of the driving shaft.

9. In a speed changing device, a driven internal gear, a driving shaft, a series of arms pivotally connected with said driving shaft and disposed at equal intervals around said shaft, said arms having portions inclining at an angle to the central longitudinal axis of said shaft, the ends of the arms being arranged to engage the teeth of the internal gear, a slotted guide plate carried by said shaft, the slots in said guide plate being arranged to receive the ends of said arms, a perforated spreader plate slidably disposed on said driving shaft, said arms extending through the perforations in said spreader plate, means for moving the spreader plate longitudinally of the inclined portion of the arms, thereby spreading the ends of the arms toward or away from the driving shaft, means for simultaneously raising or lowering the driving shaft, said last named means comprising slidable cam members provided with slots, a bearing frame for the driving shaft having portions arranged to enter the slots in the cam members, means for moving said cam members longitudinally of the driving shaft, and means for preventing the longitudinal movement of said bearing frame.

AARON FRETZ.

Witnesses:
 RANDOLPH KIBBY,
 MARTIN MOYER.

Copies of this patent may be obtained for five cents each, by addressing the "Commissioner of Patents, Washington, D. C."